United States Patent [19]

Wycheck

[11] 4,021,621

[45] May 3, 1977

[54] AUTOMATIC GROUP EXCLUSION CIRCUIT FOR A KEY TELEPHONE SYSTEM

[75] Inventor: Thomas Joseph Wycheck, Harrisburg, Pa.

[73] Assignee: International Telephone and Telegraph Corporation, Nutley, N.J.

[22] Filed: May 7, 1976

[21] Appl. No.: 684,340

[52] U.S. Cl. .................................................. 179/99
[51] Int. Cl.² ....................................................... H04M 1/68
[58] Field of Search ............... 179/99, 18 F, 18 FA, 179/19–22, 30, 38, 17 B, 18 DA

[56] References Cited

UNITED STATES PATENTS

| | | | |
|---|---|---|---|
| 3,514,544 | 5/1970 | Chambers, Jr. | 179/17 B |
| 3,860,763 | 1/1975 | Sudoh et al. | 179/18 DA |
| 3,941,943 | 3/1976 | Matheny | 179/99 |
| 3,961,144 | 6/1976 | Hirate | 179/99 |
| 3,967,076 | 6/1976 | Balzer | 179/99 |

Primary Examiner—Kathleen H. Claffy
Assistant Examiner—Gerald L. Brigance

Attorney, Agent, or Firm—J. T. O'Halloran; Alfred C. Hill

[57] ABSTRACT

The exclusion circuit includes a normally de-energized relay and a normally non-conducting Darlington pair circuit powered from the key telephone system power supply. The Darlington pair circuit is maintained non-conducting and the relay is maintained de-energized when one of the telephones of a non-excluded group of telephones goes off-hook before one of the telephones of the excluded group of telephones goes off-hook to prevent the one of the telephones of the excluded group of telephones from having access to the excluded central office line, while the Darlington pair circuit is rendered conductive for actuating the relay when one of the telephones of the excluded group of telephones goes off-hook before the one of the telephones of the non-excluded group of telephones goes off-hook to allow the one of the telephones of the excluded group of telephones to have access to the excluded central office line.

9 Claims, 1 Drawing Figure

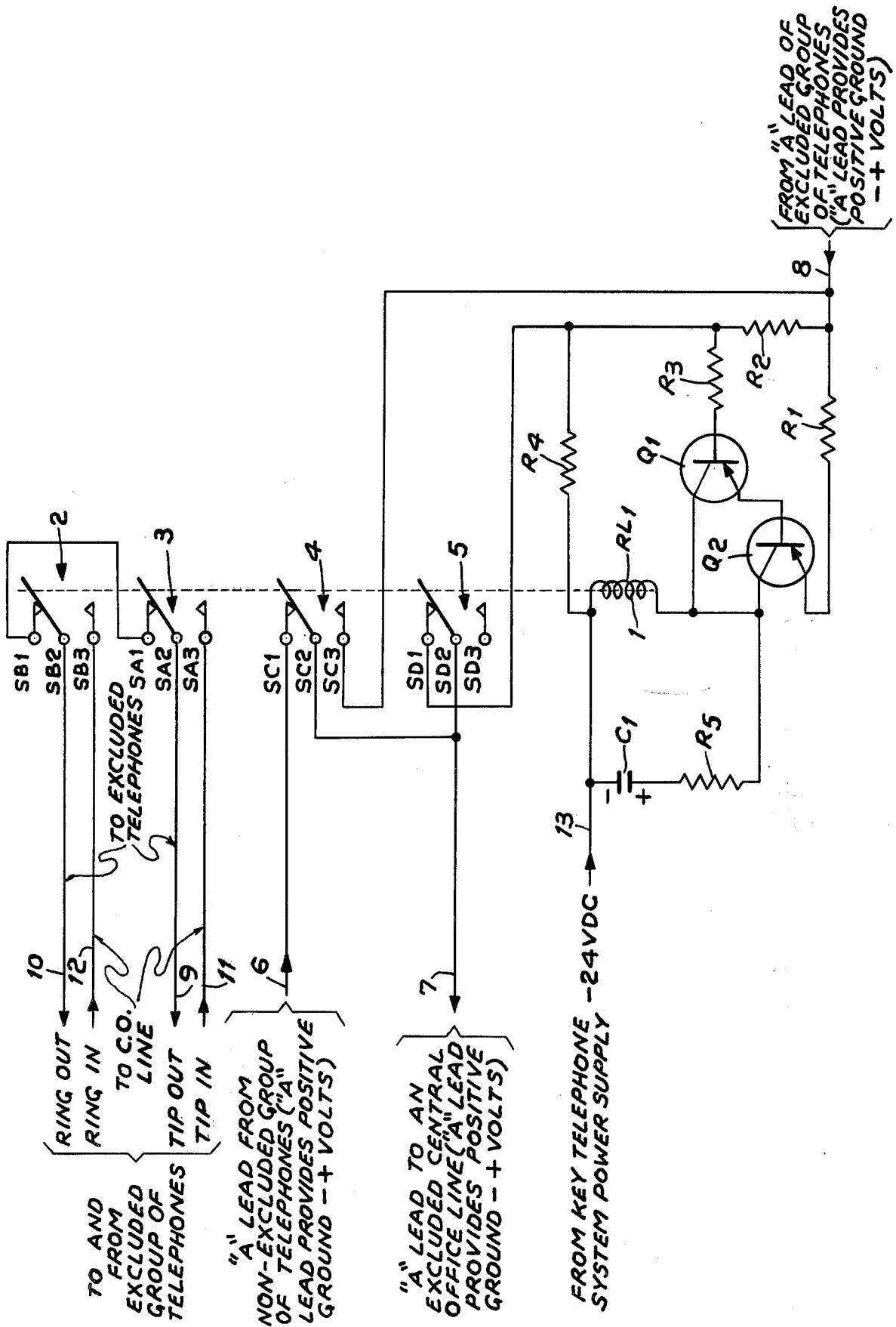

AUTOMATIC GROUP EXCLUSION CIRCUIT FOR A KEY TELEPHONE SYSTEM

BACKGROUND OF THE INVENTION

This invention relates to group exclusion circuits and more particularly to a group exclusion circuit for key telephone systems.

There are various forms of group exclusion circuits known in the prior art. Some of the exclusion circuits are automatic and some are semi-automatic. Other than their operation, the exclusion circuits arrive at the same result. The resulting performance allows one group of telephones priority to a central office telephone line over another group of telephones. This is accomplished automatically by a high priority group telephone accessing an excluded central office line before a low priority group of telephones or semi-automatically by the high prior group telephones manually activating the group exclusion circuit.

These known group exclusion circuits are either powered by the central office line voltage or independently by a separate power supply.

There are several shortcomings of the above-mentioned exclusion circuits. These shortcomings are in the method in which the circuit is powered. Circuits operating from the central office line voltage are dependent upon central office line power. A varying line voltage will cause intermittent operation of the group exclusion circuit and in effect group exclusion will be defeated. Circuits operating from a key system power supply are independent of central office line voltage, but generally employ a multiplicity of electromechanical relays which places a large load on the power supply and reduces the efficiency of the circuit.

SUMMARY OF THE INVENTION

An object of the present invention is to provide an automatic group exclusion circuit for a key telephone system overcoming the abovementioned shortcomings of the prior art group exclusion circuits.

Another object of the present invention is to provide an automatic group exclusion circuit for key telephone systems which employ in combination solid state circuitry with a single relay.

Still another object of the present invention is to provide an automatic group exclusion circuit which is powered from the key telephone system power supply and, thus, is independent of central office line voltage.

A feature of the present invention is the provision of an automatic group exclusion circuit connected to an excluded group of telephones, a non-excluded group of telephones and an excluded central office line, the exclusion circuit comprising: a normally de-energized relay coupled to the excluded group of telephones, the non-excluded group of telephones and the excluded central office line; and a normally non-conducting transistor circuit coupled to the relay and the excluded group of telephones, the transistor circuit being responsive to one of the telephones of the non-excluded group of telephones going off-hook before one of the telephones of the excluded group of telephones goes off-hook to maintain the circuit non-conducting and to maintain the relay de-energized to prevent the one of the telephones of the excluded group of telephones from having access to the central office line and the transistor circuit being responsive to the one of the telephones of the excluded group of telephones going off-hook before the one of the telephones of the non-excluded group of telephones goes off-hook to render the transistor circuit conductive for actuating the relay to allow the one of the telephones of the excluded group of telephones to have access to the central office line.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a schematic diagram of the automatic group exclusion circuit in accordance with the principles of the present invention.

DESCRIPTION OF THE PREFERRED EMBODIMENT

Referring to the FIGURE, transistors Q1 and Q2 are connected to provide a Darlington pair circuit and relay RL1 is connected in the collector circuit of transistors Q1 and Q2. Relay RL1 includes a relay coil 1 and four contact sets 2–5. Capacitor C1 and resistor R5 perform as transient suppressors and a hold-up circuit for relay RL1. Resistors R4 and R2 form a bias network for the Darlington pair circuit. Resistor R3 is a base current limiting resistor and resistor R1 is a pull-up resistor for the base voltage of transistor Q1. The circuit in accordance with the principles of the present invention is powered from the key telephone system power supply coupled to input 13.

When one telephone of a non-excluded group of telephones is removed off-hook on an excluded central office line before one telephone of an excluded group of telephones is removed off-hook, a positive ground (+ volts) is connected via the "A" lead of the non-excluded group of telephones to terminal 6 and, hence, through contact SC1, armature SC2, armature SD2 and contact SD1 to the intersection of resistors R4, R2 and R3 and also to the "A" control lead of the excluded central office line connected to output terminal 7. When the circuit is in this condition and a telephone of an excluded group of telephones is removed off-hook on the excluded central office line, a positive ground is placed via its "A" lead and input terminal 8 to the intersection of resistors R2 and R1 and contact SC3. A positive ground at the intersection of resistors R1 and R2 provides an operating potential for relay RL1, however, due to the positive ground at the intersection of resistors R4, R2 and R3, the proper base current to saturate transistors Q1 and Q2 cannot be obtained and, thus, relay RL1 will be maintained de-energized. This results in the tip conductor output coupled to terminal 9 and the ring conductor output coupled to terminal 10 of the excluded group of telephones being connected together via armature SA2, contacts SA1 and SB1 and armature SB2 preventing access to the excluded central office line.

A telephone of the excluded group of telephones can gain access to the excluded central office line by going off-hook before a telephone of the non-excluded group of telephones, or by having the controlling party break the positive ground to the group exclusion circuit supplied from input terminal 6. When there is a positive ground at the intersection of resistors R2 and R1 via input terminal 8 and the "A" lead of a telephone of the excluded group of telephones and there is no positive ground at the intersection of resistors R4, R2 and R3, the Darlington pair circuit will be properly biased for conduction and thereby activates relay RL1. The actuation of relay RL1 connects the tip conductor input at terminal 11 to tip conductor output at terminal 9 and the ring conductor input at terminal 12 to the ring conductor output at terminal 10 via contact sets 2 and 3 thereby allowing a telephone of the excluded group of telephones access to the excluded central office line. Capacitor C1 will charge via the Darlington pair circuit and resistor R5 to −24 VDC (direct current voltage).

Also, armature SC2 makes contact with contact SC3 and armature SD2 makes contact with contact SD3. Once relay RL1 is actuated, the "A" lead control at terminal 7 to the excluded central office line is received via armature SC2, contact SC3 and the "A" lead at terminal 8 of the excluded group of telephones. Also, once relay RL1 is activated, a telephone of the excluded group of telephones will remain accessed to the excluded central office line since the positive ground path of a telephone of the non-excluded group of telephones is removed via contact SC1 and armature SC2.

Capacitor C1, once charged, holds relay RL1 activated while a telephone of an excluded group of telephones, the only telephone connected to the excluded central office line, places the excluded central office line "on-hold". When a key telephone places an excluded central office line "on-hold" by pressing the hold button, the "A" lead coupled to the excluded central office line via terminal 7 is first removed from the central office line. Next removed are the tip and ring leads. When this is done, the ground placed at the intersection of resistors R1 and R2 by a telephone of the excluded group of telephones is removed. The ground to the excluded central office line at terminal 7 is also removed via armature SC2 and contact SC3 before the circuit path to the tip and ring conductors is broken. The tip and ring conductors are then disconnected from the central office line via the hold button, although relay RL1 is still activated due to the holding effect of capacitor C1.

In a successful reduction to practice of the group exclusion circuit of the present invention, the following components were employed:

| | |
|---|---|
| RL1 | 4 Pole Double Throw Relay |
| C1 | 6.8uf Electrolytic Capacitor |
| Q1, Q2 | 2N3645 Transistor |
| R1 | 220 Ohm, ½ Watt Resistor |
| R2 | 56K Ohm, ½ Watt Resistor |
| R3 | 20K Ohm, ½ Watt Resistor |
| R4 | 100K Ohm, ½ Watt Resistor |
| R5 | 10 Ohm, ½ Watt Resistor |

While I have described above the principles of my invention in connection with specific apparatus it is to be clearly understood that this description is made only by way of example and not as a limitation to the scope of my invention as set forth in the objects thereof and in the accompanying claims.

I claim:

1. An automatic group exclusion circuit connected to an excluded group of telephones, a non-excluded group of telephones and an excluded central office line, said exclusion circuit comprising:
 a normally de-energized relay coupled to said excluded group of telephones, said non-excluded group of telephones and said excluded central office line; and
 a normally non-conducting transistor circuit coupled to said relay and said excluded group of telephones, said transistor circuit being responsive to one of said telephones of said nonexcluded group of telephones going off-hook before one of said telephones of said excluded group of telephones goes off-hook to maintain said circuit non-conducting and to maintain said relay de-energized to prevent said one of said telephones of said excluded group of telephones from having access to said central office line and said transistor circuit being responsive to said one of said telephones of said excluded group of telephones going off-hook before said one of said telephones of said nonexcluded group of telephones goes off-hook to render said transistor circuit conductive for actuating said relay to allow said one of said telephones of said excluded group of telephones to have access to said central office line.

2. A circuit according to claim 1, wherein said relay includes
 a relay coil, and
 a plurality of contact sets; and further including
 a series circuit including a capacitor and resistor coupled in shunt relation with said relay coil, said series circuit providing a transient suppressor and a hold-up circuit for said relay coil.
 an input for operating voltage from a key telephone system power supply coupled to a junction of said series circuit and said relay coil.

3. A circuit according to claim 2, wherein said plurality of contact sets include
 a first contact set having a first armature coupled to a ring conductor output to said excluded group of telephones, a first contact coupled to a ring conductor input from said excluded group of telephones and a second contact,
 a second set of contacts having a second armature coupled to a tip conductor output to said excluded group of telephones, a third contact coupled to said second contact and a fourth contact coupled to a tip conductor input from said excluded group of telephones,
 a third set of contacts having a fifth contact coupled to an "A" lead input from said nonexcluded group of telephones, a third armature coupled to an "A" lead output to said central office line, and a sixth contact coupled to an "A" lead input from said excluded group of telephones,
 A fourth set of contacts having a fourth armature coupled to said "A" lead output to said central office line and a seventh contact coupled to said transistor circuit.

4. A circuit according to claim 3, wherein all of said "A" leads provide a positive ground thereon when said one of said telephones of said non-excluded group of telephones and said one of said telephones of said excluded group of telephones are off-hook.

5. A circuit according to claim 4, wherein said transistor circuit includes
 a Darlington pair circuit coupled to said relay coil, said seventh contact and said "A" lead input from said excluded group of telephones.

6. A circuit according to claim 5, wherein said Darlington pair circuit includes a first transistor having its collector coupled to said relay coil, a second transistor having its collector coupled to said relay coil and its base coupled to the emitter of said first transistor, a first resistor coupled between the emitter of said second transistor and said "A" lead input from said excluded group of telephones, a second resistor coupled between said "A" lead input from said excluded group of telephones and said seventh contact, a third resistor coupled between the base of said first transistor and a junction of said second resistor and said seventh contact, and a fourth resistor coupled between said seventh contact and said relay coil.

7. A circuit according to claim 1, wherein when said one of said telephones of said excluded group of telephones and said one of said telephones of said excluded group of telephones goes off-hook a positive ground is applied to said exclusion circuit.

8. A circuit according to claim 7, wherein said transistor circuit is a Darlington pair circuit.

9. A circuit according to claim 1, wherein said transistor circuit is a Darlington pair circuit.

* * * * *